(12) United States Patent
Surcouf et al.

(10) Patent No.: US 10,581,873 B2
(45) Date of Patent: Mar. 3, 2020

(54) SECURING MICRO-SERVICES

(71) Applicant: Cisco Technology, Inc., San Jose, CA (US)

(72) Inventors: Andre Surcouf, Saint Leu la Foret (FR); Jérôme Tollet, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 136 days.

(21) Appl. No.: 15/646,389

(22) Filed: Jul. 11, 2017

(65) Prior Publication Data
US 2019/0020665 A1    Jan. 17, 2019

(51) Int. Cl.
| | |
|---|---|
| *G06F 21/60* | (2013.01) |
| *G06F 21/50* | (2013.01) |
| *H04L 29/06* | (2006.01) |
| *H04L 29/08* | (2006.01) |
| *G06F 21/53* | (2013.01) |
| *H04L 9/32* | (2006.01) |
| *G06F 21/57* | (2013.01) |
| *G06F 21/55* | (2013.01) |

(52) U.S. Cl.
CPC .......... *H04L 63/1408* (2013.01); *G06F 21/53* (2013.01); *H04L 9/3236* (2013.01); *H04L 9/3297* (2013.01); *H04L 67/10* (2013.01); *H04L 67/16* (2013.01); *H04L 67/32* (2013.01); *G06F 21/552* (2013.01); *G06F 21/57* (2013.01); *H04L 63/0263* (2013.01); *H04L 63/1441* (2013.01); *H04L 63/20* (2013.01); *H04L 67/141* (2013.01); *H04L 2209/38* (2013.01)

(58) Field of Classification Search
CPC ....... H04L 63/0281; G06F 21/60; G06F 21/50
See application file for complete search history.

(56) References Cited

U.S. PATENT DOCUMENTS

| | | |
|---|---|---|
| 9,467,476 B1 | 10/2016 | Shieh et al. |
| 9,521,115 B1 | 12/2016 | Woolward |

(Continued)

OTHER PUBLICATIONS

Prabath Siriwardena, "Securing Microservices", Apr. 12, 2016, 15 pages.

(Continued)

*Primary Examiner* — Izunna Okeke
(74) *Attorney, Agent, or Firm* — Edell, Shapiro & Finnan, LLC

(57) ABSTRACT

A computing device running a local enforcement agent is configured to instantiate at least one application container at the computing device, where the at least one application container is part of a containerized application. The computing device is also configured to associate the local enforcement agent with the least one application container so that the local enforcement agent operates as an intra-application communication proxy for the least one application container. The local enforcement agent receives an intra-application Application Programming Interface (API) call that is sent to the at least one application container from a second application container that is part of the containerized application. The local enforcement agent is configured to analyze the intra-application API call for compliance with one or more security policies associated with the at least one container.

20 Claims, 6 Drawing Sheets

(56) References Cited

U.S. PATENT DOCUMENTS

| | | | |
|---|---|---|---|
| 2006/0143715 A1* | 6/2006 | Chow | G06F 21/629 |
| | | | 726/27 |
| 2017/0070504 A1 | 3/2017 | Ramachandran et al. | |
| 2018/0167217 A1* | 6/2018 | Brady | H04L 9/3247 |
| 2018/0359218 A1* | 12/2018 | Church | H04L 63/0263 |

OTHER PUBLICATIONS

Patrick Nommensen, "Building Microservices: Using an API Gateway", Jun. 16, 2015, DZone, 12 pages.
Andrey Chausenko, "API Gateway for Dockerized Microservices", Memz.co, https://memzco/api-gateway-microservices-docker-node-js/, Apr. 4, 2016, 9 pages.

* cited by examiner

SECURING MICRO-SERVICES

TECHNICAL FIELD

The present disclosure relates to securing micro-services with a distributed enforcement system.

BACKGROUND

The micro-service architecture (micro-services or microservices) refers to a computing architectural style in which software applications are deployed as modular services that each run a unique process to perform a discrete business function. The modular services are independent from one another and communicate through a lightweight mechanism, such as Application Program Interfaces (APIs). The micro-service architecture is highly scalable and has revolutionized the way applications are being developed and deployed. For example, the micro-service architecture enables the continuous delivery/deployment/integration of large/complex applications and enables an enterprise/organization to evolve its technology stack.

A software/application container ("container") is a type of operating system level (OS-level) virtualization technique that allows an application and its dependencies to run as a resource-isolated process. That is, a container is a lightweight, stand-alone, executable package of a piece of software that includes everything needed to run the software, including code, runtime, system tools, system libraries, settings, etc. bundled into one package. Unlike virtual machines (VM), containers have no need for embedded operating systems and calls/requests are made for operating system resources via an API.

Containers and the micro-services architecture are distinct from one another, where a micro-service may run in a container, but a container need not be used for a micro-service. However, containers have lightweight and portability properties which make them well suited for deploying micro-services. For example, container-based micro-services are being widely adopted in the Data Center/Cloud Industry where, rather than building a single large, monolithic application (i.e., a single-tiered software application that is self-contained and independent from other computing applications), the container-based micro-services split the application into a set of smaller, interconnected services.

DESCRIPTION OF EXAMPLE EMBODIMENTS

Overview

Figure 1:
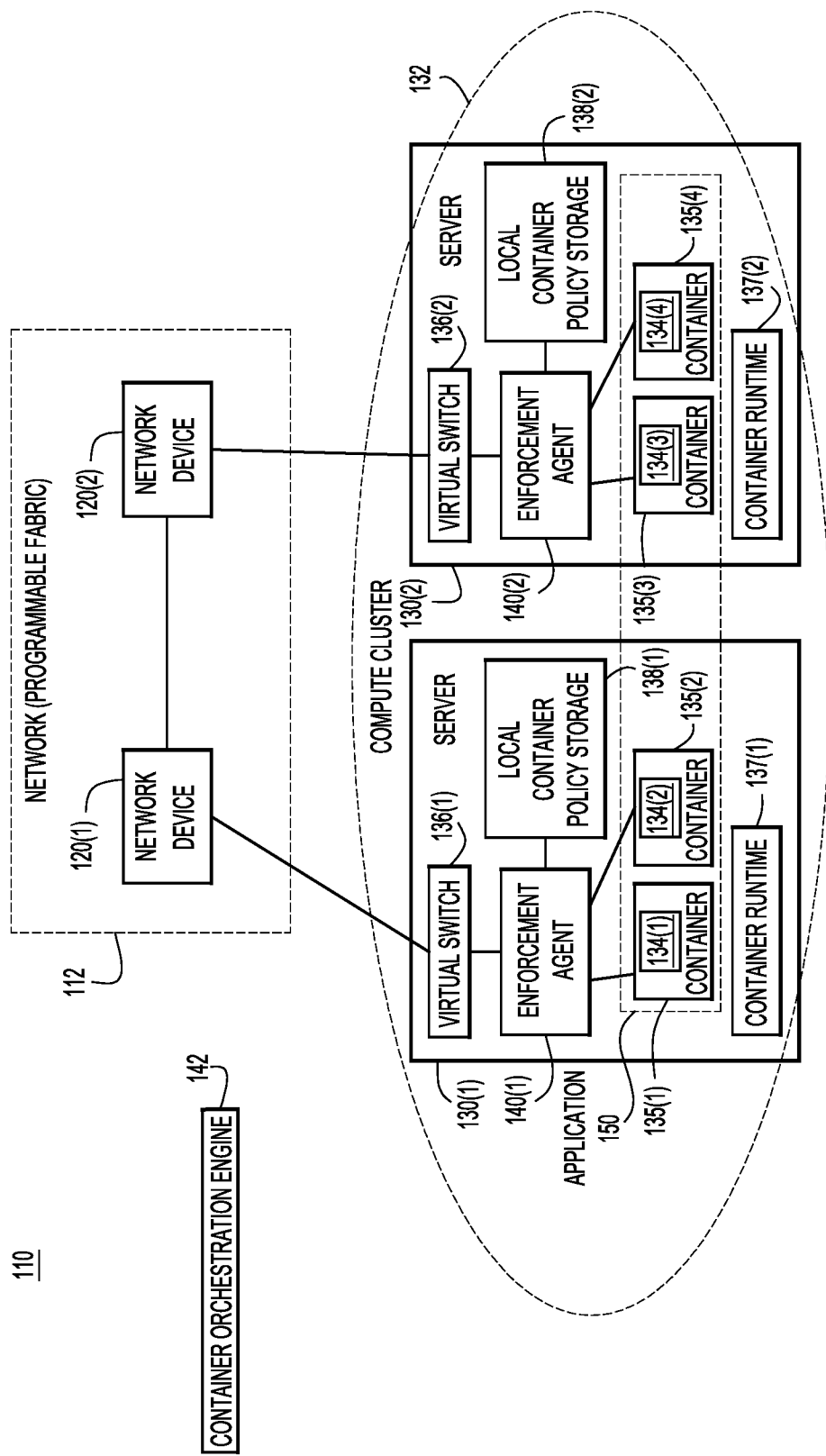
FIG. 1 is a block diagram illustrating a network environment configured to implement the techniques presented herein, according to an example embodiment.

Briefly, aspects presented herein are generally directed to techniques for securing container with a distributed enforcement system comprising enforcement agents disposed locally on container-hosting computing devices. In particular, a computing device running a local enforcement agent is configured to instantiate at least one application container at the computing device, where the at least one application container is part of a containerized application. The computing device is also configured to associate the local enforcement agent with the least one application container so that the local enforcement agent operates as an intra-application communication proxy for the least one application container. The local enforcement agent receives an intra-application Application Programming Interface (API) call that is sent to the at least one application container from a second application container that is part of the containerized application. The local enforcement agent is configured to analyze the intra-application API call for compliance with one or more security policies associated with the at least one container.

Example Embodiments

The micro-services based architecture is a new fundamental technique for writing applications where, instead of writing code in a "monolithic" manner (i.e., as a single-tiered and self-contained application that is independent form other computing applications), applications are disaggregated into small and loosely coupled micro-services. The micro-services communicate with one another using application program interfaces (APIs) over standard protocols, such as Hyper Text Transfer Protocol (HTTP), HTTP Secure (HTTPS), etc.

There are a number of publicly available container platforms/registries that make micro-services (e.g., databases, load balancers, etc.) available for use by application developers. As such, there is an increasing tendency for application developers to download micro-services, in forms of containers, from these publicly available container platforms and to incorporate the downloaded container-based micro-services into their applications. In this type of programming model, if an application developer is not satisfied with a given container-based micro-service, he/she will likely switch to another container-based micro-service that performs the same function, rather than attempt to debug or modify the original micro-service. While this programming model facilitates coding efficiency, it also introduces security issues. In particular, the application developers may not be intimate with the internal operations of the containers that are downloaded and incorporated into the application. As a result, the application developer may unknowingly introduce security threats into the core of the application that is being built.

Presented herein are techniques for securing an application that includes downloaded, and thus untrusted, container-based micro-services. In particular, the techniques presented herein create a distributed enforcement system (e.g., a distributed API gateway) that is used for policy enforcement on intra-application (i.e., inter-container) traffic.

Referring first to FIG. 1, shown is a block diagram illustrating a network environment 110 in which techniques in accordance with examples presented herein may be implemented. The network environment 110 includes a network (e.g. programmable fabric) 112 formed by a set of interconnected network devices/nodes (e.g., switches, routers, etc.). For ease of illustration, FIG. 1 illustrates an example in which the network 112 comprises two network devices 120(1) and 120(2). It is also to be appreciated that the specific arrangement of FIG. 1 is illustrative and that other arrangements in accordance with examples presented herein may include different numbers of network devices in a number of different arrangements.

In FIG. 1, a plurality of container-hosting computing (compute) devices are connected to the network 112. More specifically, computing devices 130(1) and 130(2) are connected to the network devices 120(1) and 120(2), respectively. In accordance with examples presented herein, the computing devices 130(1) and 130(2) are physical endpoints (e.g., servers) that collectively form a compute cluster 132. For ease of description, the computing devices 130(1) and 130(2) are referred to herein as servers 130(1) and 130(2).

The servers 130(1) and 130(2) are configured to host one or more container-based micro-services 134. More specifically, server 130(1) hosts container-based micro-services 134(1) and 134(2), while server 130(2) hosts container-based micro-services 134(3) and 134(4). The container-based micro-services 134(1)-134(4) are each formed as part of a respective application container 135(1)-135(4), which is a stand-alone executable software packages that include the respective micro-service and everything needed to run the respective micro-service, including code, runtime, system tools, system libraries, settings, etc., bundled into the software package. The servers 130(1) and 130(2) also include a container runtime 137(1) and 137(2), respectively. The container runtime 137(1) and 137(2) are basic container software layers that are configured to, among other container lifecycle events, spawn, start, stop, delete, etc. containers on/at the respective server.

In general, it is to be appreciated that the application containers 135(1)-135(4) and micro-services 134(1)-134(4) are "instances" (i.e., one instantiation of) a class or type of container or micro-service that may be made available to users via, for example, a container platform. For ease of description, the container instances 135(1)-135(4) are referred to simply as "containers" and the micro-services instances are referred to simply as "micro-services" or "container-based micro-services."

FIG. 1 also illustrates that the servers 130(1) and 130(2) also include a virtual switch 136(1) and 136(2), respectively, a local container policy storage 138(1) and 138(2), respectively, and a local enforcement agent 140(1) and 140(2), respectively. Similar to the containers/micro-services, the local enforcement agents are local instances (i.e., one instantiation of) a class or type of enforcement agent. For ease of description, the local enforcement agent instances 140(1) and 140(2), are referred to simply as "enforcement agents," which collectively form a "distributed enforcement system." In certain examples, the distributed enforcement system is a distributed API gateway and the enforcement agents are API gateway agents (API gateway instances). The enforcement agents 140(1) and 140(2) may, in certain examples, be implemented as a container-based micro-service.

Also shown in FIG. 1 is a central management system in the form of at least one Container Orchestration Engine (COE) 142. The Container Orchestration Engine 142 is configured to allocate appropriate compute resources to the containers 135(1)-135(4) and can communicate with various entities hosted at the servers 130(1) and 130(2), such as the local container policy storages 138(1) and 138(2), the container runtimes 137(1) and 137(2), the Enforcement agents 140(1) and 140(2), etc. For ease of illustration, connections between the Container Orchestration Engine 142 and the various entities hosted at the servers 130(1) and 130(2) have been omitted from FIG. 1. Although not shown in FIG. 1, the network environment 110 may also include a container networking plug-in that operates with the Container Orchestration Engine 142. A container networking plug-in is a layer that handles the container networking for the servers 130(1) and 130(2) and which is in communication with the Container Orchestration Engine 142 to instantiate and manage the containers 135(1)-135(4) in the compute cluster 132.

As noted above, shown in FIG. 1 are containers 135(1) and 135(2) hosted at server 130(1) and containers 135(3) and 135(4) hosted at server 130(2). The containers 135(1)-135(4) each include a respective micro-service 134(1)-134(4), where the micro-services 134(1)-134(4) collectively form an application 150. That is, the application 150 is formed by a plurality of container-based micro-services that are distributed across the servers 130(1) and 130(2) (i.e., across the compute cluster 132). Since the application 150 is formed by a plurality of containers 135(1)-135(4) that each include a respective micro-service 134(1)-134(4), the application 150 is sometimes referred to herein as container-based or containerized application. Application program interfaces (APIs) are used for the intra-application (inter-container) communication (i.e., the communication between containers and/or container-based micro-services 134(1)-134(4)).

Also as noted above, a problem with applications built using a plurality of container-based micro-services is that the application developer is typically unfamiliar with the internal operations of the containers, particularly when the containers are downloaded from a publicly available container platform/registry. As such, containers may include security threats that are unknown to the application developer. If a container that includes a security threat, sometimes referred to herein as a "malicious container," is incorporated into an application, the application is vulnerable from an internal attack/threat via the malicious container. The security threats presented by a malicious container incorporated into an application is sometimes referred to herein as an "internal security threat" since the threat is from within/inside the application itself. These internal security threats are difficult to detect and address using conventional techniques. As such, in the example of FIG. 1, the techniques presented herein utilize the inter-container traffic (i.e., the APIs) to protect the container-based micro-services 134(1)-134(4)), and thus the containerized application 150, from internal security threats.

More specifically, when each of the containers 135(1)-135(4) is instantiated, the container may expose a large number of APIs (e.g., Representational state transfer (REST) APIs) for communication with other containers (i.e. for inter-container communication). Each container 135(1)-135(4) provides to the Container Orchestration Engine 142 an exhaustive list of the APIs that the respective container exposes for use by other containers. Each container 135(1)-135(4) also provides the Container Orchestration Engine 142 the ports (e.g., Transmission Control Protocol (TCP) or User Datagram Protocol (UDP) ports) on which it is listening to for the REST APIs.

Although each container 135(1)-135(4) may expose a large number of APIs, in the context of the containerized application 150, only a subset of these available APIs may be needed within the containerized application 150. The Container Orchestration Engine 142 enables an administrator or other user to define various security policies/rules defining communications that are allowed/permitted within the containerized application 150 (e.g., rules describing how containers 135(1)-135(4) are allowed to communicate between themselves, such as what subset of the available APIs may be called, answered, which containers can make calls to specific other containers, etc.). For example, each pair of containers may have a set of security policies associated therewith and the set of security policies associated with the pair of containers may include lists of allowed/permitted API calls/requests, where the permitted API calls are likely only a subset of the API calls available for the two containers. In one example, for an API exposed by a container, a list of authorized callers (other containers) is created, where the authorized callers are represented by, for example, there Internet Protocol (IP) address, name, or other identifier.

In the arrangement of FIG. 1, the security policies may be configured such that containers 135(1) and 135(2) are each allowed/permitted to communicate with container 135(3). However, the security policies may be configured such that containers 135(1) and 135(2) each have different rights that grant them access to different REST APIs on container 135(3).

Once security policies for one or more of the containers 135(1)-135(4) are defined at the Container Orchestration Engine 142, the security policies are distributed to the servers 130(1) and 130(2) and stored within the respective local container policy storage 138(1) or 138(2). The Container Orchestration Engine 142 may distribute all of the security policies for the containers 135(1)-135(4) to each of the servers 130(1) and or only distribute a subset of the security policies to each of the servers. For example, Container Orchestration Engine 142 may only distribute to a server security policies that are associated with the containers hosted on the server. As described further below, the security polices for a specific one of the containers 135(1)-135(4) may be distributed when the container is created at one of the servers 130(1) or 130(2).

The sets of security policies defining communications that are permitted within the containerized application 150 are enforced using a distributed enforcement system, sometimes referred to herein as a distributed API gateway, which is formed by the enforcement (API gateway) agents 140(1) and 140(2). More specifically, each server 130(1) and 130(2) has a corresponding local enforcement agent 140(1) and 140(2) (e.g. an NGINX proxy used as an enforcement for particular containers) that is associated with the respective local containers. In the example of FIG. 1, enforcement agent 140(1) is associated with containers 135(1) and 135(2), while enforcement agent 140(2) is associated with containers 135(3) and 135(4).

As described elsewhere herein, the enforcement agents 140(1) and 140(2) operate to provide man-in-the-middle (MITM) protection for the containerized application 150. That is, the enforcement agents 140(1) and 140(2) are functionally integrated into the containerized application 150 so that intra-application (i.e., inter-container) traffic, such as API calls/requests and API answers/responses, pass through one or more the enforcement agents distributed on the servers 130(1) and 130(2). As such, the enforcement agents 140(1) and 140(2) are configured to analyze the intra-application traffic for compliance with the security policies received from the Container Orchestration Engine 142. By enforcing policies on the inter-container traffic, the enforcement agents 140(1) and 140(2) (i.e., the distributed enforcement system) can detect and address (e.g., prevent) internal security threats within the containerized application 150 that arise, for example, due to the incorporation of a malicious container into the containerized application 150.

In certain examples, the enforcement agents 140(1) and 140(2) are configured as reverse proxies that secure the intra-application (e.g., East-West) communication by verifying whether an API calls and/or answers (responses) between two containers violates the associated security policies. That is, the enforcement agents 140(1) and 140(2) may use one or more authentication and authorization mechanisms to enforce the security policies (stored in the local container policy storage 138(1) or 138(2)). This enforcement may include, for example, determining/verifying whether an API call (request) and/or an API answer (response) is permitted, determining whether the headers of an API call and/or API answer are malformed or malicious, determining whether the content of an API call and/or API answer are malformed or malicious, and/or enforcing any authentication rules according to a chosen authentication model. In addition to enforcement of the security policies, the enforcement agents 140(1) and 140(2) may also log API calls and/or answers for traceability.

In accordance with certain examples, the virtual switches 136(1) and 136(2) enable the intra-application (e.g., East-West) communication. The virtual switches 136(1) and 136(2) are configured (e.g., via dynamically deployment of Layer 3 and/or Layer 4 rules by Container Orchestration Engine 142) to divert appropriate intra-application traffic to the associated enforcement agent 140(1) or 140(2) for analysis.

In accordance with examples presented herein, the security rules for the containerized application 150 are dynamically deployed or removed from the local container policy storages 138(1) and/or 138(2) when containers are spawned/created or deleted, respectively. In addition, each time a container is deployed on a server 130(1) or 130(2), the container is associated with the corresponding local enforcement agent 140(1) or 140(2). The corresponding local enforcement agent 140(1) or 140(2) is then configured to contact the Container Orchestration Engine 142 to obtain the corresponding API rules for the particular container (e.g., a list of authorized callers with possibly some associated rules).

In certain examples, Group Based Policy (GBP) or Security Group (SG) techniques may be used to map containers running within the containerized application 150 to rules defined in the Container Orchestration Engine 142. In such examples, each time a container is created it will therefore possible to authenticate the newly created container asking for API protection (e.g., a container code MD5 signature, etc.). The creation of an additional enforcement agent (i.e., enforcement agent) could follow a similar process to ensure that a non-authenticated enforcement agent cannot participate in the communication between a containers and the container callers.

An example sequence in accordance with examples presented herein is described in detail below. For ease of description, the example sequence is described with reference to the arrangement of FIG. 1.

The implementing code for a container 134 (i.e., the container implementing code and not an instance of the container) or the implementing code for an enforcement (enforcement) agent (e.g., the container implementing enforcement agent code) is "known" by the Container Orchestration Engine 142. This knowledge is represented by a specific set of rules for that particular type of container, plus associated information (e.g., signatures, etc.). This information is also securely stored by the Container Orchestration Engine 142. When instantiated/created at runtime, the enforcement agents (e.g., a NGINX proxy packaged in a container) register against the Container Orchestration Engine 142. This registration triggers some specific Container Orchestration Engine code to authenticate the created enforcement agent (i.e., the enforcement agent instance) and to provide the enforcement agent credentials for further access to the Container Orchestration Engine 142. The mechanism for delivering these credentials may make use of some form of a secure communication channel between the Container Orchestration Engine 142 and the enforcement agent.

In addition, when instantiated/created at runtime, instances of a container (i.e., containers 135(1)-135(4)) request API protection from the Container Orchestration Engine 142. The containers 135(1)-135(4) identify themselves to the Container Orchestration Engine 142 using different types of identification information, such as an Internet Protocol (IP) address (e.g., IPv6 address) or other unique identifying information. The receipt of an API protection request triggers some specific Container Orchestration Engine application code specific to this container class, which authenticates the container instance and sends the container a reference to the local enforcement agent. Again, the mechanism for this initial communication between a container instance the Container Orchestration Engine 142 make use of some form of a secure communication channel. In an alternative example, instead of being provided by the Container Orchestration Engine 142, the reference of the local enforcement agent could be provided by an external orchestration mechanism.

Using the provided reference, the container instance then connects with the local enforcement agent. The enforcement agent uses the container identity (e.g., name, signature, IP address, etc.) and sends a security policy request to the Container Orchestration Engine 142. The security policy request triggers the application code for this particular container, in the Container Orchestration Engine 142, to provide all of the security policies associated with the particular application container instance.

In accordance with the techniques described herein, there is generally little difference in nature between a container implementing some application code and a container controlling the access to the API of the former. The "identity" of a container is actually represented by the corresponding code running in the Container Orchestration Engine 142. This allows for the creation of a fully distributed enforcement system tailored for containers while also leveraging container technology. In the techniques presented herein, each enforcement agent does not need to communicate with its neighbors. Enforcement agent scaling is possible since additional enforcement agents can be created, as described above. In certain examples, the enforcement agents can also be provisioned in advance and stay dormant until being activated to protect an application container instance.

As shown in FIG. 1, to avoid "tromboning" of the traffic between the servers 130(1) and 130(2), the local enforcement agents 140(1) and 140(2) are deployed at each server (i.e., the distributed enforcement system is deployed across both computing devices). In operation, the distributed enforcement system operates acts as a reverse proxy that receives every API call and answer. As such, distributed enforcement system is able to analyze the calls and answers for compliance with the security policies associated with the container(s) associated with the call or answer.

The containers 135(1)-135(4) are connected to the physical and virtual network through a virtual switches 136(1) and 136(2), which are software components configured to receive and forward the intra-application traffic between containers. In certain examples, specific forwarding rules can be deployed in the virtual switches 136(1) and 136(2) to divert inter-container traffic to the local enforcement agents 140(1) and 140(2). Alternatively, in other examples, virtual switches 136(1) and 136(2) can include Layer 7 processing in their forwarding logic and the local enforcement agents 140(1) and 140(2) can be implemented as a module of this category of a virtual switch in order to optimize the traffic. In this model, there is no need for communication between different processes sitting in the system (i.e., virtual switches and local enforcement agents).

Figure 2A:
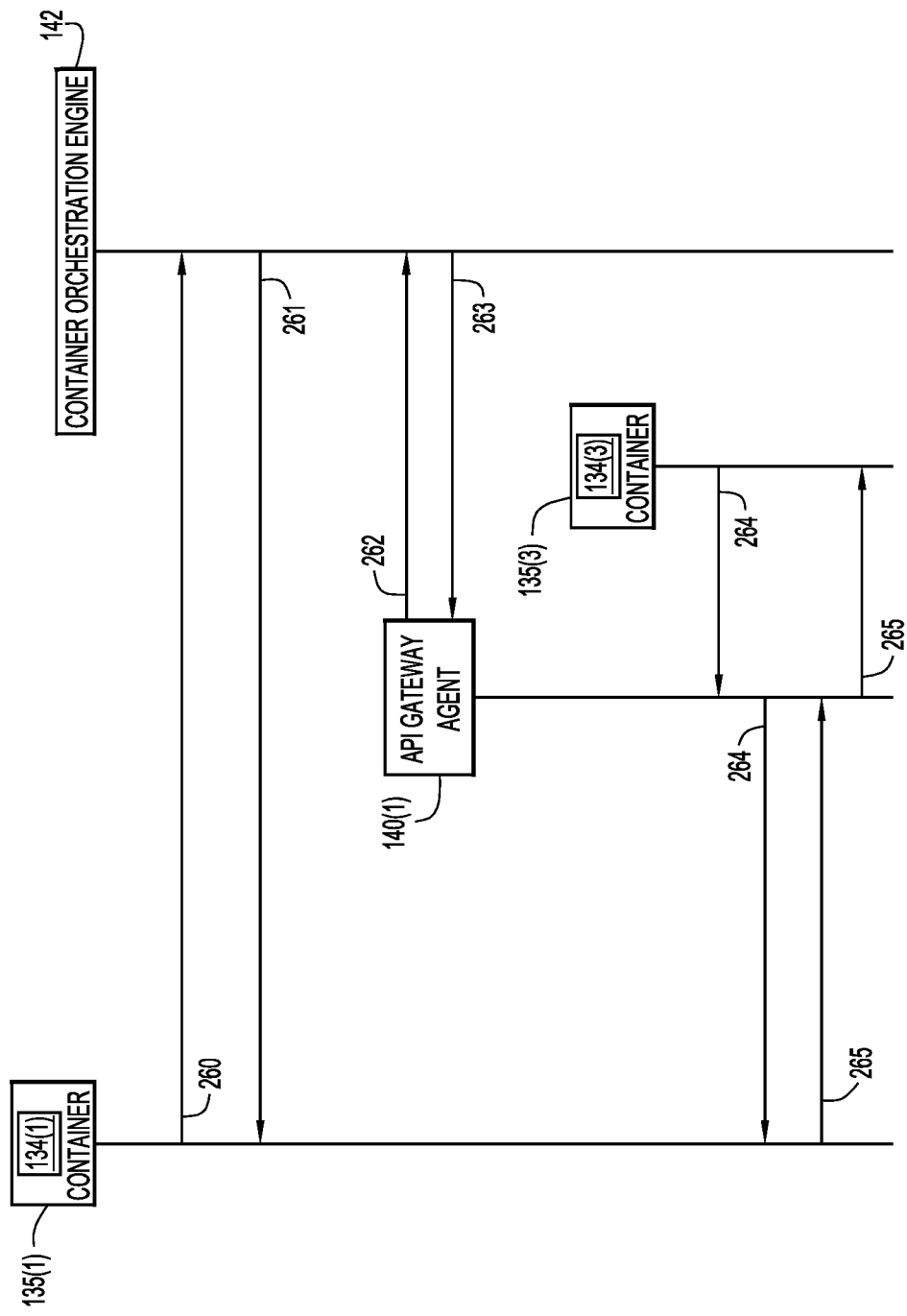
FIG. 2A is a ladder diagram illustrating an example policy enforcement flow that uses a distributed enforcement system, according to an example embodiment.
Figure 2B:
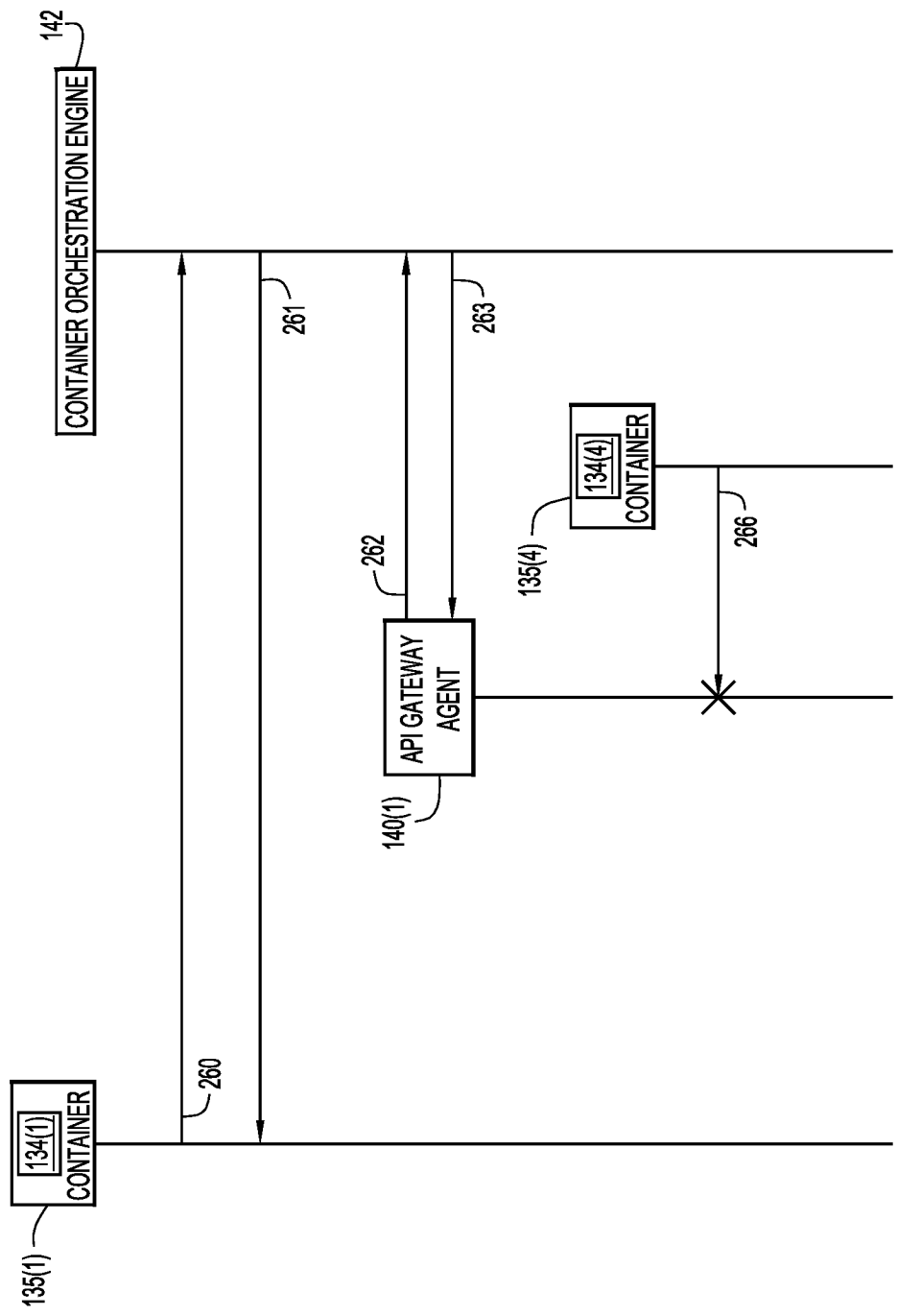
FIG. 2B is a ladder diagram illustrating another example policy enforcement flow that uses a distributed enforcement system, according to an example embodiment.

FIGS. 2A and 2B are ladder diagrams illustrating example policy enforcement flows that use a distributed enforcement system in accordance with examples presented herein. For ease of description, the examples of FIGS. 2A and 2B are each described with reference to containerized application 150 of FIG. 1, which is formed by container-based microservices 134(1)-134(4) in containers 135(1)-135(4), respectively, and the Container Orchestration Engine 142 as the central management system.

Referring first to FIG. 2A, container 135(1) sends an API protection request 260 to the Container Orchestration Engine 142 to indicate that the container 135(1) is available to accept API calls from containers having certain characteristics, which are defined in the notification. In this example, the API protection request 260 also indicates a time period (e.g., the next 30 minutes) for the availability.

In response to the API protection request 260, the Container Orchestration Engine 142 sends back to the container 135(1) a message 261 that includes a reference to the local enforcement agent, namely enforcement agent 140(1). The container 135(1) connects to the enforcement agent 140(1) and provides the enforcement agent 140(1) with container identity information (e.g., name, signature, IP address, etc.). The enforcement agent 140(1) uses the container identity to send a security policy request 262 to the Container Orchestration Engine 142 (i.e., a request for the one or more security policies associated with the container 135(1)). In response to receipt of the security policy request 262, the Container Orchestration Engine 142 sends to the enforcement agent 140(1) a message 263 that includes security policies for the container 135(1), which are stored in the local container policy storage 138(1) (shown in FIG. 1). At this point, the enforcement agent 140(1) operates as a proxy for the container 135(1), meaning that intra-application (inter-container) traffic/communications sent to/from the container 135(1) pass through the enforcement agent 140(1).

After a period of time, and assuming the container 135(1) is still available (i.e., the availability time period identified in notification 260 has not yet expired), another container can attempt to establish a communication session with container 135(1) via the enforcement agent 140(1). For example, FIG. 2A illustrates that the container 135(3) sends an API call 264 to the container 135(1). The API call 264 is diverted by virtual switch 136(1) (not shown in FIG. 2A) to enforcement agent 140(1). As described above, the enforcement agent 140(1) analyzes the API call 264 in view of the security policies associated with container 135(1) that are stored in the local container policy storage 138(1). In the example of FIG. 2A, the enforcement agent 140(1) determines that the API call 264 from container 135(3) to container 135(1) is permitted and, as such, the API call 264 is forwarded to container 135(1).

Also as shown in FIG. 2A, the container 135(1) sends an API answer (response) 265 back to container 135(3). Again, this API answer 265 is diverted to enforcement agent 140(1), which analyzes the API answer 265 in view of the security policies associated with container 135(1) that are stored in the local container policy storage 138(1). In the example of FIG. 2A, the enforcement agent 140(1) determines that the API answer 265 from container 135(1) to container 135(3) is permitted and, as such, the API answer 265 is forwarded to container 135(3).

Referring next to FIG. 2B, shown is a similar example in which the container 135(1) sends the API protection request 260 to the Container Orchestration Engine 142 to indicate that the container 135(1) is available to accept API calls from containers having certain characteristics. As described above with reference to FIG. 2A, the Container Orchestration Engine 142 sends the message 261 back to the container 135(1), where message 261 includes a reference to the local enforcement agent 140(1). The enforcement agent 140(1) also sends the security policy request 262 to the Container Orchestration Engine 142, which in turn responds with message 263 that includes the security policies for the container 135(1), which are stored in the local container policy storage 138(1).

After a period of time, and assuming the container 135(1) is still available (i.e., the availability time period identified in notification 260 has not yet expired), another container can attempt to establish a communication session with container 135(1) via the enforcement agent 140(1). For example, FIG. 2B illustrates the container 135(4) sends an API call 266 to the container 135(1). The API call 266 is diverted by virtual switch 136(1) (not shown in FIG. 2B) to enforcement agent 140(1). As described above, the enforcement agent 140(1) analyzes the API call 266 in view of the security policies associated with container 135(1) that are stored in the local container policy storage 138(1). In the example of FIG. 2B, the enforcement agent 140(1) determines that the API call 266 from container 135(4) to container 135(1) violates the security policies associated with container 135(1). As such, the API call 266 is denied/blocked at enforcement agent 140(1).

FIGS. 1, 2A, and 2B generally illustrate one implementation of a distributed enforcement system that operates with a Container Orchestration Engine as a central management system. It is to be appreciated that the above mechanisms can be generalized to any type of credential or information containers share or exchange securely. In addition, the same mechanism can be also extended to different type of workloads, such as virtual machines. In another example, block-chain may be used as the underlying infrastructure to form a distributed management system (i.e., the block chain is a distributed system per design). In other words, the example of FIG. 3 replaces the container orchestration engine of FIGS. 1, 2A, and 2B with a distributed block chain system and the enforcement agents do not depend on a centralized system.

Figure 3:
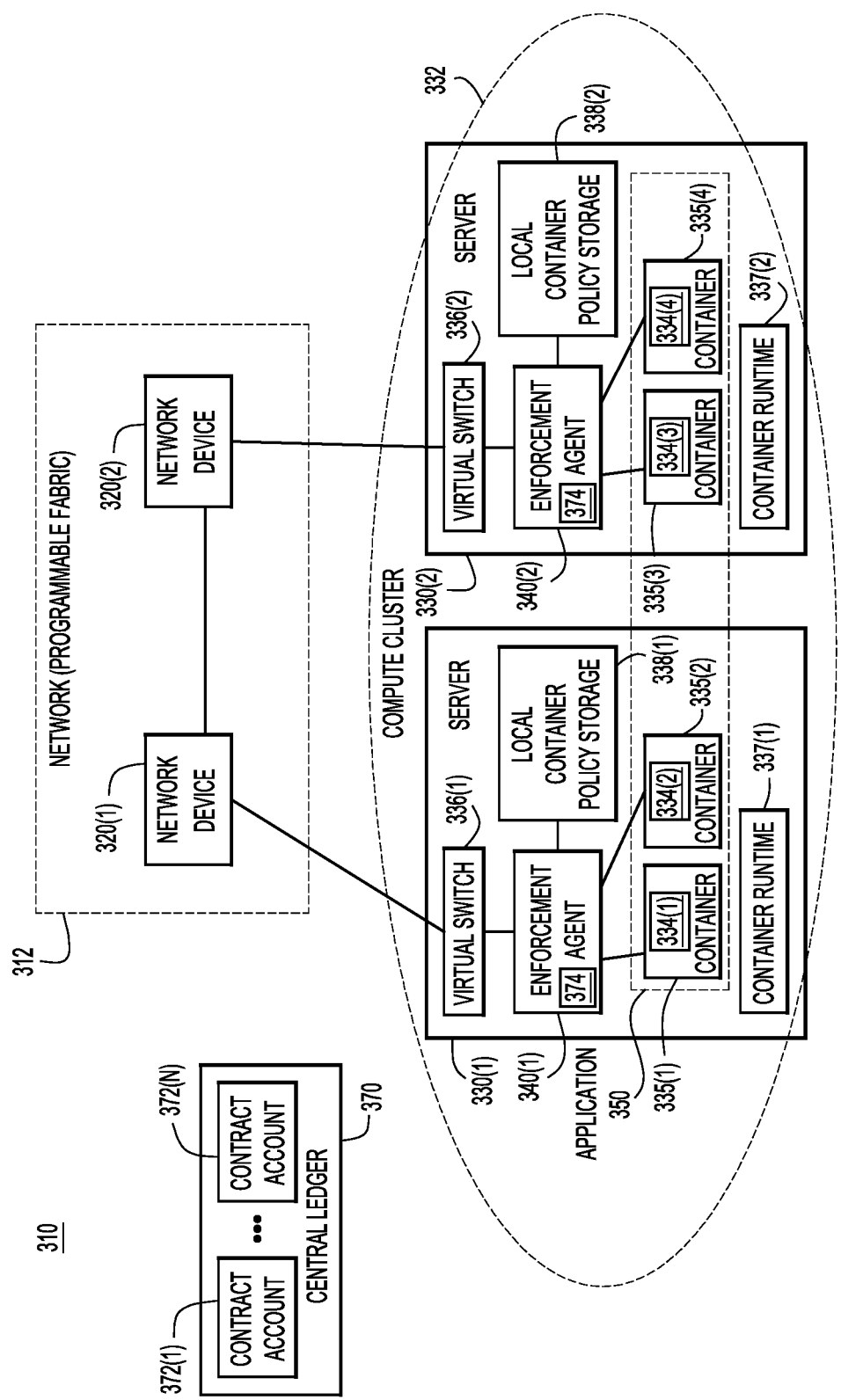
FIG. 3 is a block diagram illustrating a network environment configured to implement the techniques presented herein, according to an example embodiment.

In a classical block-chain implementation, transactions (e.g., messages) are verified by the block chain system. Such an approach is time-consuming because, in the context of intra-application traffic, before an API call can take place the transaction first needs to be verified by the block chain system. Such an arrangement would be difficult to scale and would lead to massive overhead. As such, in accordance with certain examples presented herein, block-chain is used to create an immutable and secure management system that is used for authenticating enforcement agents, as well as to provide the enforcement agents with correct access credentials. In such arrangements, the management system supports Externally Owned Accounts (EOAs) as well contract accounts (CAs) such that the management system is decentralized (distributed). FIG. 3 is a block diagram of a network environment 310 that includes a distributed management system implemented using block chain.

FIG. 3 illustrates that the network environment 310 is similar to network environment 110 of FIG. 1 and includes the network (e.g. programmable fabric) 312 formed by two network devices 320(1) and 320(2). FIG. 3 also illustrates a compute cluster 332 formed by two container-hosting computing (compute) devices 330(1) and 330(2), which are connected to the network 312. More specifically, computing devices 330(1) and 330(2) are connected to the network devices 320(1) and 320(2), respectively. For ease of description, the computing devices 330(1) and 330(2) are referred to herein as servers 330(1) and 330(2).

The servers 330(1) and 330(2) are configured to host one or more container-based micro-services 334. More specifically, server 330(1) hosts container-based micro-services 334(1) and 334(2), while server 330(2) hosts container-based micro-services 334(3) and 334(4). The container-based micro-services 334(1)-334(4) are each formed as part of a respective application container 335(1)-335(4), which is a stand-alone executable software packages that include the respective micro-service and everything needed to run the respective micro-service, including code, runtime, system tools, system libraries, settings, etc., bundled into the software package. The servers 330(1) and 330(2) also include a container runtime 337(1) and 337(2), respectively. The container runtime 337(1) and 337(2) are basic container software layers that are configured to, among other container lifecycle events, spawn, start, stop, delete, etc. containers on/at the respective server.

FIG. 3 also illustrates that the servers 330(1) and 330(2) also include a virtual switch 336(1) and 336(2), respectively, a local container policy storage 338(1) and 338(2), respectively, and an enforcement agent instance 340(1) and 340(2), respectively.

Also shown in FIG. 3 is a central ledger 370 that includes a plurality of contract accounts 372(1)-372(N). The central ledger 370 is configured to allocate appropriate compute resources to the containers 335(1)-335(4) and can communicate with various entities hosted at the servers 330(1) and 330(2), such as the local container policy storages 338(1) and 338(2), the container runtimes 337(1) and 337(2), the enforcement agents 340(1) and 340(2), etc. For ease of illustration, connections between the central ledger 370 and the various entities hosted at the servers 330(1) and 330(2) have been omitted from FIG. 3.

As noted above, shown in FIG. 3 are containers 335(1) and 335(2) hosted at server 330(1) and containers 335(3) and 335(4) hosted at server 330(2). The containers 335(1)-335(4) each include a respective micro-service 334(1)-334(4) that collectively form a containerized application 350. That is, the containerized application 350 is formed by a plurality of container-based micro-services 334(1)-334(4) that are distributed across the servers 330(1) and 330(2) (i.e., across the compute cluster 332). Application program interfaces (APIs) are used for the intra-application (inter-container) communication (i.e., the communication between container-based micro-services 334(1)-334(4)).

In the examples of FIG. 3, Externally Owned Accounts 374 are owned by enforcement agents 340(1) and 340(2) that control access to APIs of a container, as well as application containers asking for API protection. The Externally Owned Accounts 374 are physically located in each enforcement agent 340(1) and 340(2). In general, an Externally Owned Account includes contains the credentials utilized to access the central ledger 370. These credentials enable the enforcement agents 340(1) and 340(2) to activate the corresponding contract in the ledger 370.

On the other hand contract accounts 372(1)-372(N) are pieces of code running on the distributed block-chain ledger. All actions on the block-chain is set in motion by transactions/messages sent from an enforcement agent 340(1) or 340(2) to the ledger 370 to activate the corresponding contract (actually the code representing the contract), where the contract accounts are associated to contract codes. Every time a contract account 372(1)-372(N) receives a transaction, its code is executed as instructed by the input parameters sent as part of the transaction. The contract code is executed by the block-chain on each node participating in the network as part of their verification of new blocks. In other words, the block chain ledger can be seen as a list of independent distributed services (the contracts). Accessing these contracts involves a valid account (the EOA) which is controlled (authentication, security, etc.) by the contract account. An EOA provides access to one or several types of contracts (e.g., Smart Contracts).

This execution is deterministic and its only context is the position of the block on the block-chain and all data available. The blocks on the block-chain represent time units, where the block-chain itself is a temporal dimension and represents the entire history of states at the discrete time points designated by the blocks on the chain. This latter characteristic enables system to permanently store all transactions (i.e., the system will store each "ask for API protection events"). In general, the contract accounts (contracts) 372(1)-372(N) should not be interpreted as something that needs to be "fulfilled" or "complied with," but instead as entities executing a specific piece of code upon receipt of a message coming from, for example, a container instance. The contract accounts 372(1)-372(N) have direct control over their own local storage to save their permanent state. As such, the generated results from the execution of the code can therefore be as elaborated or complex as needed. The advantage of this approach is that each container can communicate with different contract accounts 372(1)-372(N) for different purposes.

An example sequence in accordance with examples presented herein is described in detail below. For ease of description, the example sequence is described with reference to the arrangement of FIG. 3.

The implementing code for a container 335(1)-335(4) (i.e., the container implementing code and not an instance of the container) or the implementing code for an enforcement agent (e.g., the container implementing enforcement agent code) is "known" by the central ledger 370. This knowledge is represented by a specific set of rules for that particular type of container, plus associated information (e.g., signatures, etc.). This information is also securely stored by the central ledger 370 and is materialized by a contract account.

When created at runtime, the enforcement agents (e.g., a NGINX proxy packaged in a container) registers against the central ledger 370. This registration process activates the corresponding contract account (i.e., the contract account for the newly created enforcement agent) which, in turn, triggers some specific contract account code to authenticate the enforcement agent and to send the enforcement agent with credentials for further access. The mechanism for delivering these credentials may make use of some form of a secure communication channel, such as the default system securing traffic between the contract accounts running in the central ledger and the enforcement agents 340(1) and 340(2).

In addition, when created at runtime, instances of a container (i.e., containers 135(1)-135(4)) request API protection against the central ledger 370. The receipt of an API protection request triggers some other specific contract account, specific to the created container class and not to the instance of such container, which authenticates the container instance and gives the container a reference to the local enforcement agent. Again, the mechanism for this initial communication between a container instance the central ledger 370 can make use of some form of a secure communication channel. In an alternative example, instead of being provided by the central ledger 370 the reference of the local enforcement agent could be provided by an external orchestration mechanism.

Using the provided reference, the container instance then connects to the local enforcement agent and provides the enforcement agent with container identity information (e.g., name, signature, IP address, etc.). The enforcement agent uses the container identity information to send a security policy request to the central ledger 370 (i.e., a request for the one or more security policies associated with the container). The security policy request triggers the contract account for this particular container, in the central ledger 370, to provide all of the security policies associated with the particular application container instance. These security policies may then be stored in the corresponding local container policy storage 338(1) or 338(2) for subsequent use by the associated enforcement agent 340(1) or 340(2).

In summary, FIG. 3 illustrates an example in which there is one contract account associated with an enforcement agent. The contract account is triggered each time an instance of an enforcement agent is created. The newly created enforcement agent instance is authenticated by the central ledger and receives credential to be used for further access to the central ledger. In addition, there is also one contract account per application container (not per application container instance). The container-specific contract account is triggered each time an instance of this application container is created. The newly created application container instance is authenticated and is given a reference to an enforcement agent instance, Since the enforcement agents in FIG. 3 are initially generic, they are configured to protect application container instance APIs. This may be implemented in several manners. In one example, the configuration information is statically defined by the contract account associated with the particular application container (e.g., can be called only by the specific application container). In another example, the configuration information is application container instance dependent. In such examples, the contract account associated with the application container could log the current configuration for this particular instance. Other examples may use a combination of a static and application container instance dependent approach.

Traffic between containers and the central ledger are also secured and authenticated. To achieve this each container at startup time will create a "wallet" by running some specific code. If the join operation is accepted by the ledger, then the container will be entitled to initiate transactions between its EOA and one or several contract accounts supported by the ledger. In general, the wallet is not persisted and does not survive to container instance termination.

In the example of FIG. 3, the block-chain ledger can maintain the history of all transactions in its own storage (the blocks from the block-chain). As such, the block-chain ledger provides the ability to trace back any potential system error or attack initiated by rogue workloads.

Figure 4:
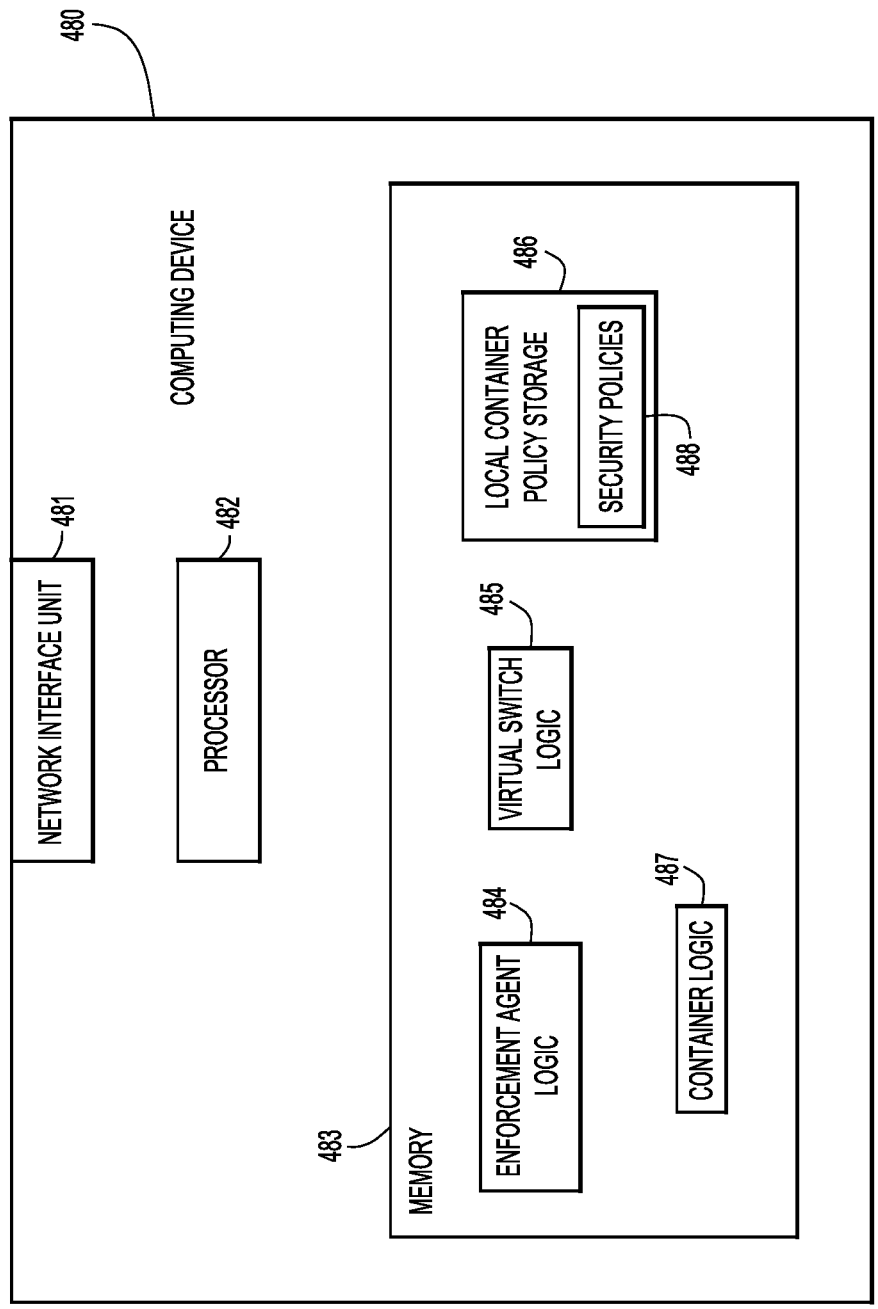
FIG. 4 is a block diagram of a computing device, according to an example embodiment.

FIG. 4 is a block diagram of a computing device (e.g., server) 480 that is configured to implement the techniques presented herein. The computing device 480 includes a network interface unit 481 that enables communication over a network (i.e., enables network connectivity), one or more processors 482 (e.g., microprocessors or microcontrollers), and a memory 482. The memory 483 includes/stores, among other elements, enforcement agent logic 484, virtual switch logic 485, a local container policy storage 486, and container logic 487. In the example of FIG. 4, the local container policy storage 486 includes security policies 488 associated within one or more containers.

The memory 483 may include read only memory (ROM), random access memory (RAM), magnetic disk storage media devices, optical storage media devices, flash memory devices, electrical, optical, or other physical/tangible memory storage devices. Thus, in general, the memory 374 may comprise one or more tangible (non-transitory) computer readable storage media (e.g., a memory device) encoded with software comprising computer executable instructions and when the software is executed (by the one or more processors 482) it is operable to perform the operations described herein with reference to a computing device, such as servers 130(1) and 130(2) of FIGS. 1, 2A, and 2B and/or servers 330(1) and 330(2) of FIG. 3. In particular, container logic 487, when executed by the one or more processors 482, is configured to implement one or more containers at the computing device 480. Similarly, the virtual switch logic 485, when executed by the one or more processors 482, is configured to perform the operations of a virtual switch, as described above, at the computing device 480. In addition, the enforcement agent logic 484, when executed by the one or more processors 482, is configured to operate perform the operations of an enforcement agent, as described above, that the computing device 480.

Figure 5:
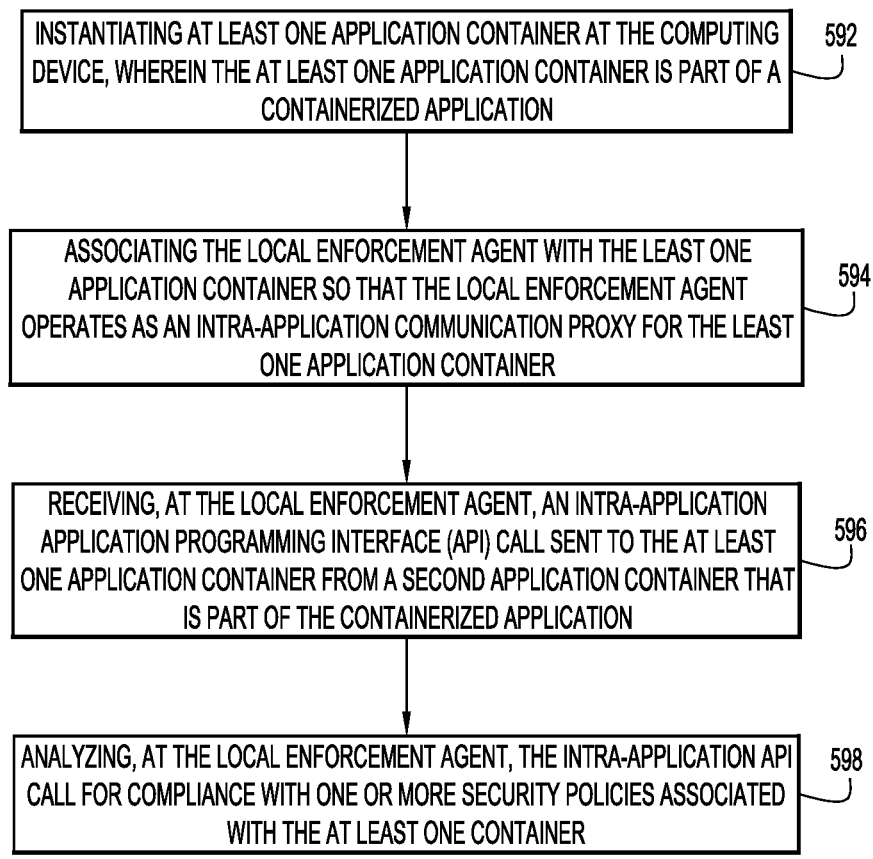
FIG. 5 is a flowchart illustrating a method, according to an example embodiment.

FIG. 5 is a flowchart of a method 590 in accordance with examples presented herein that is performed at a computing device running a local enforcement agent. Method 590 begins at 592 where the computing device instantiates (creates/spawns) at least one application container at the computing device, wherein the at least one application container is part of a containerized application. At 594, the computing device associates the local enforcement agent with the least one application container so that the local enforcement agent operates as an intra-application communication proxy for the least one application container. At 596, the local enforcement agent receives an intra-application Application Programming Interface (API) call that is sent to the at least one application container from a second application container that is part of the containerized application. At 598, the local enforcement agent analyzes the intra-application API call for compliance with one or more security policies associated with the at least one container.

As described above, micro-services based applications are becoming difficult to secure because they are often based on un-trusted components (containers) pulled from public platforms/registries. The techniques presented herein provide a security model based on distributed enforcement system (e.g., distributed API gateway) that enforces L3/L4/L7 policies for containerized applications (i.e., micro-services based applications), using the intra-application traffic (e.g., API calls and answers between containers). The techniques presented herein increase security level without introducing performance penalties such as a "tromboning" effect. The techniques presented herein can also be deployed without limiting application developers use of containers to write applications and are scalable since each element of the distributed API gateway is independent from all other elements. As such, the techniques presented herein can provide a "unified" monitoring system that can be used for detailed analytics.

In one form, a method performed at a computing device running a local enforcement agent is provided. The method comprises: instantiating at least one application container at the computing device, wherein the at least one application container is part of a containerized application; associating the local enforcement agent with the least one application container so that the local enforcement agent operates as an intra-application communication proxy for the least one application container; receiving, at the local enforcement agent, an intra-application Application Programming Interface (API) call sent to the at least one application container from a second application container that is part of the containerized application; and analyzing, at the local enforcement agent, the intra-application API call for compliance with one or more security policies associated with the at least one container.

In another form, a computing device running a local enforcement agent is provided. The computing device comprises: a network interface configured to enable connectivity to a network; a memory; and one or more processors coupled to the network interface and the memory, and configured to: instantiate at least one application container at the computing device, wherein the at least one application container is part of a containerized application; associate the local enforcement agent with the least one application container so that the local enforcement agent operates as an intra-application communication proxy for the least one application container; receive, at the local enforcement agent, an intra-application Application Programming Interface (API) call sent to the at least one application container from a second application container that is part of the containerized application; and analyze, at the local enforcement agent, the intra-application API call for compliance with one or more security policies associated with the at least one container.

In another form, one or more non-transitory computer readable storage media at a computing device running a local enforcement agent and having connectivity to a network are provided. The non-transitory computer readable storage media are encoded with instructions that, when executed by a processor, cause the processor to: instantiate at least one application container at the computing device, wherein the at least one application container is part of a containerized application; associate the local enforcement agent with the least one application container so that the local enforcement agent operates as an intra-application communication proxy for the least one application container; receive, at the local enforcement agent, an intra-application Application Programming Interface (API) call sent to the at least one application container from a second application container that is part of the containerized application; and analyze, at the local enforcement agent, the intra-application API call for compliance with one or more security policies associated with the at least one container.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method, comprising:
at a computing device running a local enforcement agent:
instantiating at least one application container at the computing device, wherein the at least one application container is part of a containerized application;
associating the local enforcement agent with the at least one application container so that the local enforce- ment agent operates as an intra-application communication proxy for the at least one application container;

receiving, at the local enforcement agent, an intra-application Application Programming Interface (API) call sent to the at least one application container from a second application container that is part of the containerized application; and analyzing, at the local enforcement agent, the intra-application API call for compliance with one or more security policies associated with the at least one application container;

wherein the one or more security policies associated with the at least one application container comprise:

a list of one or more APIs exposed by the at least one application container, wherein the local enforcement agent receives the list of the one or more APIs from the at least one application container in response to instantiating the at least one application container and associating the local enforcement agent with the at least one application container; and for each of the one or more APIs, a list of containers within the containerized application authorized to call a corresponding API.

2. The method of claim 1, wherein associating the local enforcement agent with the at least one application container comprises:

sending, by the at least one application container, an API protection request for the at least one application container to a management system;

receiving, at the at least one application container, a reference to the local enforcement agent from the management system; and based on the reference, connecting the at least one application container to the local enforcement agent.

3. The method of claim 2, further comprising:

sending, by the local enforcement agent, a security policy request to the management system;

receiving, from the management system, the one or more security policies associated with the at least one application container; and locally storing the one or more security policies at the computing device.

4. The method of claim 2, wherein the management system is a central management system that includes a container orchestration engine.

5. The method of claim 2, wherein the management system is a distributed management system that includes a block-chain central ledger.

6. The method of claim 1, further comprising:

instantiating the local enforcement agent at the computing device;

sending, from the computing device, a request to register the local enforcement agent with a management system; and receiving, from the management system, credentials for use by the local enforcement agent for subsequent access to the management system.

7. A computing device running a local enforcement agent, comprising:

a network interface configured to enable connectivity to a network;

a memory; and one or more processors coupled to the network interface and the memory, and configured to:

instantiate at least one application container at the computing device, wherein the at least one application container is part of a containerized application;

associate the local enforcement agent with the at least one application container so that the local enforcement agent operates as an intra-application communication proxy for the at least one application container;

receive, at the local enforcement agent, an intra-application Application Programming Interface (API) call sent to the at least one application container from a second application container that is part of the containerized application; and analyze, at the local enforcement agent, the intra-application API call for compliance with one or more security policies associated with the at least one application container;

wherein the one or more security policies associated with the at least one application container comprise:

a list of one or more APIs exposed by the at least one application container, wherein the local enforcement agent receives the list of the one or more APIs from the at least one application container in response to instantiating the at least one application container and associating the local enforcement agent with the at least one application container; and for each of the one or more APIs, a list of containers within the containerized application authorized to call a corresponding API.

8. The computing device of claim 7, wherein to associate the local enforcement agent with the at least one application container the one or more processors are configured to:

send, from the at least one application container, an API protection request for the at least one application container to a management system;

receive, at the at least one application container, a reference to the local enforcement agent from the management system; and using the reference, connect the at least one application container to the local enforcement agent.

9. The computing device of claim 8, wherein the one or more processors are configured to:

send, from the local enforcement agent, a security policy request to the management system;

receive from the management system, the one or more security policies associated with the at least one application container; and locally store the one or more security policies within the memory of the computing device.

10. The computing device of claim 8, wherein the management system is a central management system that includes a container orchestration engine.

11. The computing device of claim 8, wherein the management system is a distributed management system that includes a block-chain central ledger.

12. The computing device of claim 7, wherein the one or more processors are configured to:

instantiate the local enforcement agent at the computing device;

send a request to register the local enforcement agent with a management system; and receive, from the management system, credentials for use by the local enforcement agent for subsequent access to the management system.

13. One or more non-transitory computer readable storage media at a computing device running a local enforcement agent and having connectivity to a network, wherein the non-transitory computer readable storage media are encoded with instructions that, when executed by a processor, cause the processor to:

instantiate at least one application container at the computing device, wherein the at least one application container is part of a containerized application;

associate the local enforcement agent with the at least one application container so that the local enforcement agent operates as an intra-application communication proxy for the at least one application container;

receive, at the local enforcement agent, an intra-application Application Programming Interface (API) call sent to the at least one application container from a second application container that is part of the containerized application; and analyze, at the local enforcement agent, the intra-application API call for compliance with one or more security policies associated with the at least one application container;

wherein the one or more security policies associated with the at least one application container comprise:

a list of one or more APIs exposed by the at least one application container, wherein the local enforcement agent receives the list of the one or more APIs from the at least one application container in response to instantiating the at least one application container and associating the local enforcement agent with the at least one application container; and for each of the one or more APIs, a list of containers within the containerized application authorized to call a corresponding API.

14. The non-transitory computer readable storage media of claim 13, wherein the instructions operable to associate the local enforcement agent with the at least one application container comprise instructions operable to:

send, by the at least one application container, an API protection request for the at least one application container to a management system;

receive, at the at least one application container, a reference to the local enforcement agent from the management system; and using the reference, connect the at least one application container to the local enforcement agent.

15. The non-transitory computer readable storage media of claim 14, further comprising instructions operable to:

send, from the local enforcement agent, a security policy request to the management system;

receive, from the management system, the one or more security policies associated with the at least one application container; and locally store the one or more security policies at the computing device.

16. The non-transitory computer readable storage media of claim 14, wherein the management system is a central management system that includes a container orchestration engine.

17. The non-transitory computer readable storage media of claim 13, further comprising instructions operable to:

instantiate the local enforcement agent at the computing device;

send, from the computing device, a request to register the local enforcement agent with a management system; and receive, from the management system, credentials for use by the local enforcement agent for subsequent access to the management system.

18. The method of claim 1, wherein analyzing the intra-application API call comprises analyzing one or more of an API call header and an API call content to verify that the intra-application API call is not malicious or malformed.

19. The computing device of claim 7, wherein the one or more processors configured to analyze the intra-application API call are configured to analyze one or more of an API call header and an API call content to verify that the intra-application API call is not malicious or malformed.

20. The non-transitory computer readable storage media of claim 13, wherein the instructions to analyze the intra-application API call comprise instructions to analyze one or more of an API call header and an API call content to verify that the intra-application API call is not malicious or malformed.

* * * * *